(12) United States Patent
Manning

(10) Patent No.: US 7,795,569 B2
(45) Date of Patent: Sep. 14, 2010

(54) FOCAL PLANE DETECTOR WITH INTEGRAL PROCESSOR FOR OBJECT EDGE DETERMINATION

(75) Inventor: Paul Antony Manning, Malvern (GB)

(73) Assignee: QinetiQ Limited, Farnborough, Hants (GB)

( * ) Notice: Subject to any disclaimer, the term of this patent is extended or adjusted under 35 U.S.C. 154(b) by 1427 days.

(21) Appl. No.: 10/503,345

(22) PCT Filed: Jan. 31, 2003

(86) PCT No.: PCT/GB03/00410

§ 371 (c)(1),
(2), (4) Date: Aug. 2, 2004

(87) PCT Pub. No.: WO03/067873

PCT Pub. Date: Aug. 14, 2003

(65) Prior Publication Data

US 2005/0127272 A1  Jun. 16, 2005

(30) Foreign Application Priority Data

Feb. 2, 2002 (GB) .................. 0202469.3

(51) Int. Cl.
*H01L 27/00* (2006.01)
*H01J 40/14* (2006.01)
*H03K 17/78* (2006.01)
*H04N 3/14* (2006.01)
*H01L 31/062* (2006.01)

(52) U.S. Cl. .............. 250/208.1; 250/214 R; 250/214 SW; 348/308; 257/292

(58) Field of Classification Search ............ 250/208.2, 250/208.5, 214 R, 214 SW, 559.29, 559.36, 250/338.1, 208.1, 214 A, 214 LS, 214.1, 250/214 AL, 216; 327/94, 206; 348/64, 348/185, 222.1, 230.1, 245, 259, 307–310, 348/332, 694, 705, 300–301; 356/4.01, 5.09, 356/141.1, 152.3; 257/290–293, 432, 461
See application file for complete search history.

(56) References Cited

U.S. PATENT DOCUMENTS 4,659,928 A  4/1987  Tew (Continued)

FOREIGN PATENT DOCUMENTS

| EP | 0 303 940 A | 2/1989 |
|---|---|---|
| JP | 2-250474 | 10/1990 |
| JP | 5-219440 | 8/1993 |
| JP | 6-38110 | 2/1994 |
| JP | 7-239930 | 9/1995 |
| JP | 8-275059 | 10/1996 |
| JP | 11-225289 | 8/1999 |

OTHER PUBLICATIONS

Kuo; "BICMOS Edge Detector With Correlated-Double-Sampling Readout Circuit for Pattern Recognition Neural Network"; Electronics Letter, IEE Stevenage, GB, vol. 27, No. 14, 04 Jul. 1991, pp. 1248-1250, XP000213788.

*Primary Examiner*—Georgia Y Epps
*Assistant Examiner*—Don Williams
(74) *Attorney, Agent, or Firm*—Nixon & Vanderhye P.C.

(57) ABSTRACT

A focal plane detector for imaging objects within a scene and having integral processing means for detecting edges of objects within the scene. The focal plane detector comprises a plurality of detector elements arranged to measure the intensity of the electromagnetic radiation incident thereon and processing means integral to the focal plane detector for combining the intensity measurements so as to indicate the difference in the intensity of the electromagnetic radiation. The focal plane detector is arranged such that the output from the focal plane detector corresponds to edges of objects within the scene. The focal plane detector may be arranged to be sensitive to infrared radiation.

25 Claims, 2 Drawing Sheets

U.S. PATENT DOCUMENTS

| | | |
|---|---|---|
| 5,012,343 A | 4/1991 | Jensen |
| 5,351,309 A | 9/1994 | Lee et al. |
| 5,539,458 A | 7/1996 | Yamada |
| 5,554,849 A * | 9/1996 | Gates .................... 250/370.08 |
| 5,729,285 A * | 3/1998 | Peterson et al. ............. 348/162 |
| 6,084,635 A | 7/2000 | Nakamura |
| 6,441,372 B1 * | 8/2002 | Kawahara ................... 250/332 |
| 6,444,996 B1 * | 9/2002 | Boenick et al. ........ 250/559.36 |
| 6,528,788 B1 * | 3/2003 | Galloway ................... 250/332 |
| 6,559,447 B2 * | 5/2003 | Wood ......................... 250/332 |

* cited by examiner

FOCAL PLANE DETECTOR WITH INTEGRAL PROCESSOR FOR OBJECT EDGE DETERMINATION

This application is a US national phase of PCT International application No. PCT/GB03/00410, filed 31 Jan. 2003, which designated the US and claims priority to GB Application No. 0202469.3, filed 2 Feb. 2002. The entire contents of these applications are incorporated herein by reference.

The present invention relates to a focal plane detector and particularly to a focal plane detector for detecting edges of objects within a scene. The invention has particular although not exclusive relevance to infrared focal plane detectors.

Conventional focal plane detectors typically comprise an array of optoelectronic sensors arranged to detect electromagnetic radiation incident on the sensors within the array. Generally, the optoelectronic sensors provide an output (for example a voltage, a current, a resistance, a capacitance or a charge) which varies as a function of the intensity of the electromagnetic radiation incident on the sensors. When used in conjunction with focusing means, for example a lens, the sensor outputs from such a focal plane array may be used to reconstruct an image of objects within a scene.

The output from the focal plane detector may be processed to provide useful information about objects within the scene. One particular processing function is to detect edges of objects within the scene in order to define the outline of said objects. Edge detection is commonly used as a precursor to automated detection and recognition of objects within a scene.

Conventional focal plane detectors utilise image processing means to process the outputs from the focal plane detector in order to detect edges of objects within a scene. Edge detection techniques are usually implemented in software and comprise complex algorithms for extracting features from the image of the scene. The software and hardware requirements of such an image processing system are non-trivial both technically and financially. Further, the image processing means may impose performance restrictions on the focal plane detector, for example by reducing the effective operating speed (frame rate) of the focal plane detector.

Focal plane detectors incorporating integral image processing means provide an alternative to simple focal plane detectors. For example, U.S. Pat. No. 6,084,635 describes an image sensor having integral image processing means configured to provide a smoothed output without recourse to external data-storage devices. One embodiment of the image sensor described in U.S. Pat. No. 6,084,635 detects edges of objects within a scene. The image sensor utilises a 'neuron' MOSFET to take a weighted average of outputs from a local cluster of photoelectric elements to effectively create a 'smoothed' image. In this system, the presence of an edge in the image is detected by comparing the output signal from the central photoelectric element in the cluster with the smoothed signal. The architecture of the system described in U.S. Pat. No. 6,084,635 is however somewhat complicated and is not capable of detecting both edges of objects within a scene and conventional intensity information from the scene.

EP 0 303 940 describes a linear image sensor configured to scan optical information from an information carrier (e.g. a printed page) by relative motion between the information carrier and the image sensor. The sensor comprises two parallel rows of photodiodes. The image sensor is fabricated such that adjacent photodiodes in both rows have a common electrode. The common electrode provides a differential signal corresponding to the difference in the illumination of the adjacent photodiodes.

In common with the system described in U.S. Pat. No. 6,084,635, the linear image sensor of EP 0 303 940 is not capable of detecting both edges of objects on the information carrier and conventional intensity information from the information carrier. Furthermore, the two parallel rows of photodiodes are intended to work in a single orientation which is fixed during the fabrication of the device.

By way of further example U.S. Pat. No. 5,351,309 describes an image sensor capable of extracting edges of objects within a detected image.

EP 0 632 663 describes an image processing apparatus comprising a colour single-sensor camera, and a method for interpolating luminance values between pixels in the camera. EP 0 632 663 is aimed at reducing colour edge artifacts.

It is an object of the present invention to mitigate at least some of the disadvantages of the prior art. It is a further object of the present invention to provide a focal plane detector capable of directly outputting an image consisting of the edges of the objects within a scene.

According to a first aspect of the present invention, a focal plane detector comprises a plurality of detector elements, each detector element adapted to receive electromagnetic radiation and configured to provide an output dependent on the intensity of the electromagnetic radiation incident thereon, means integral to the focal plane detector for combining the output from a first detector element with that from a second detector element so as to indicate the difference in the intensity of the electromagnetic radiation incident on the first and second detector elements, characterised by selecting means capable of selecting, for any chosen first detector element within the focal plane detector, a second detector element from any of the plurality of remaining detector elements with which to combine the output from the first detector element, the output from the focal plane detector comprising the result from the combining means.

This is advantageous in that the focal plane detector provides a key image processing function by producing information on the gradient of the image intensity rather than intensity itself. Accordingly, the focal plane detector may be configured to detect edges of objects within a scene without recourse to external image processing means. No additional hardware or software are required external to the focal plane detector.

The selecting means provide the advantage that the outputs from the individual detector elements are reconfigurable. The selecting means enable the individual detector elements to be reconfigured, thereby allowing the focal plane detector to detect edges of objects within the scene occurring in a plurality of different orientations therein. The focal plane detector is not restricted to detecting edges of objects within a scene occurring in a single orientation.

An additional benefit of a differential configuration such as this, in which the difference is taken across simultaneously operating active elements which are nominally identical, is that there is excellent rejection of common spurious noise and any effects due to changes which affect the whole array.

In a preferred embodiment, the first and second detector elements are disposed adjacent each other within the focal plane detector.

Conveniently, the detector elements are arranged in rows and columns therein.

The arrangement of the detector elements in rows and columns facilitates selection of the detector elements within the focal plane detector.

In a preferred embodiment, the first detector element and the second detector element are arranged in adjacent columns within the focal plane detector.

In further preferred embodiment, the first detector element and the second detector element are arranged in adjacent rows within the focal plane detector.

In another preferred embodiment, the first detector element is arranged in a first column and a first row within the focal plane detector and the second detector element is arranged in an adjacent column and an adjacent row to those of the first detector element.

Advantageously, the detector elements may be adapted to detect infrared radiation.

The detector elements may adapted to detect radiation having a wavelength in the range 3 μm-14 μm.

In a preferred embodiment, the detector elements comprise bolometers. The first detector element may be biased by a first bias voltage and the second detector element may be biased by a second bias voltage, said bias voltages being of substantially equal magnitude.

The first and second bias voltages may have the same polarity and the combining means may comprise means for determining a difference in the outputs from the first and second detector elements. Alternatively, the first and second bias voltages may have opposite polarity and the combining means may comprise means for summing the outputs from the first and second detector elements.

The foregoing description of the biasing arrangements for the detector elements is particularly applicable to detector elements comprising bolometers. However, this arrangement is also applicable to other types of detector elements which rely on a bias voltage for their operation.

In a further preferred embodiment, the selecting means are configured such that the detector elements detect differences in the intensity of the electromagnetic radiation incident on the focal plane array in a first direction and a second direction, the first and second directions being different.

Preferably, the selecting means are capable of selecting, for any chosen first detector element within the focal plane array, a dummy detector element. In this embodiment, the combining means are adapted to combine the output from the first detector element with that from the dummy detector element, so as to indicate the intensity of the electromagnetic radiation incident on the first detector element.

The dummy detector is arranged to be substantially insensitive to the electromagnetic radiation incident on the focal plane detector. The dummy detector may be inherently insensitive to electromagnetic radiation or may be rendered insensitive by shielding the dummy detector from the incident radiation. The dummy detector typically comprises a detector element having similar electrical and physical properties as the active detector elements in the focal plane detector, and indeed the dummy detector may be integral to said focal plane detector. The dummy detector may be used to offset the bulk of the output from the chosen first detector element.

According to a second aspect of the present invention, there is now proposed a camera having a focal plane detector according to the first aspect of the present invention. Preferably, the camera is adapted to detect edges of the objects within a scene. The camera may comprise a thermal imager.

According to a third aspect of the present invention, a method of detecting an edge of an object within a scene incident on a focal plane detector having a plurality of detector elements, each detector element adapted to receive electromagnetic radiation incident thereon, comprises the steps of i. selecting a first detector element within the focal plane detector and a second detector element from any of the plurality of remaining detector elements within the focal plane detector, ii. determining the intensity of the electromagnetic radiation incident on the first detector element within the focal plane detector, iii. determining the intensity of the electromagnetic radiation incident on the second detector element within the focal plane detector, iv. determining the difference in the intensity of the electromagnetic radiation incident on the first and second detector elements, and v. communicating the difference in the intensity as an output from the focal plane detector.

This method of detecting an edge of an object within a scene requires no additional hardware or software external to the focal plane detector, thereby minimising the technical complexity and hence cost of the system.

The step of selecting the first and second detector elements from those within the focal plane detector provides the advantage that the outputs from the individual detector elements may be combined in a number of different configurations. The step of selecting the detector elements enables the individual detector elements to be reconfigured so as to detect edges of objects within the scene occurring in a plurality of different orientations therein. Hence, the selecting step allows the outputs of the detector elements to be selectively compared.

Conveniently, the detector elements are arranged in an array having rows aligned in a first direction and columns aligned in a second direction.

In a preferred embodiment, the method comprises the step of selecting a first detector element in a first column within the focal plane detector and selecting a second detector element in an adjacent column, and detecting edges of objects aligned substantially parallel with the second direction.

In a further preferred embodiment, the method comprises the step of selecting a first detector element in a first row within the focal plane detector and selecting a second detector element in an adjacent row, and detecting edges of objects aligned substantially parallel with the first direction.

In a another preferred embodiment, the method comprises the step of selecting a first detector element in a first column and a first row within the focal plane detector and selecting a second detector element in an adjacent column and an adjacent row to those of the first detector element, and detecting edges of objects aligned substantially parallel with a direction which bisects the angle between the first and second directions.

Preferably, the first direction and the second direction are substantially perpendicular. In use, the first direction may be arranged to be substantially vertical. Alternatively, the first direction may be arranged to be substantially horizontal in use.

Although the foregoing describes embodiments of the present invention in which the outputs of the detector elements are reconfigurable by selecting means, the focal plane detector may be arranged such that the configuration of the detector elements is fixed during fabrication of the focal plane detector.

Hence, according to a another aspect of the present invention, there is now proposed a focal plane detector comprising a plurality of detector elements, each detector element adapted to receive electromagnetic radiation and configured to provide an output dependent on the intensity of the electromagnetic radiation incident thereon, means integral to the focal plane detector for combining the output from a first detector element with that from a second detector element so as to indicate the difference in the intensity of the electromagnetic radiation incident on the first and second detector elements, the output from the focal plane detector comprising the result from the combining means.

This is advantageous in that the focal plane detector provides a key image processing function by producing information on the gradient of the image intensity rather than intensity itself. Accordingly, the focal plane detector may be configured to detect edges of objects within a scene without recourse to external image processing means. No additional hardware or software are required external to the focal plane detector.

The invention will now be described, by example only, with reference to the accompanying drawings in which;

FIG. 2 is a schematic representation of a section of a focal plane detector according to the present invention.

FIG. 3 is a schematic representation of a section of a focal plane detector according to the present invention.

A conventional focal plane detector typically comprises an array of optoelectronic sensors arranged to detect electromagnetic radiation incident on the sensors within the array. Typically, the optoelectronic sensors comprise individually addressable elements arranged in a matrix configuration. Each element may be referred to as a picture element or 'pixel'.

Traditionally, the output of each optoelectronic sensor within the focal plane array may be switched to the output of the array and this facilitates addressing of the optoelectronic sensors within the array.

The switchable output from an optoelectronic sensor within the array varies as a function of the intensity of the electromagnetic radiation incident on the sensor. When used in conjunction with focusing means, for example a lens, the sensor outputs from such a focal plane array may be used to reconstruct an image of objects within a scene.

The optoelectronic sensors may be sensitive to electromagnetic radiation having wavelengths in the visible band (380 nm to 780 nm approximately). Alternatively, or in addition, the optoelectronic sensors may be sensitive to electromagnetic radiation having wavelengths in the infrared waveband (780 nm to 15,000 nm approximately).

Figure 1:
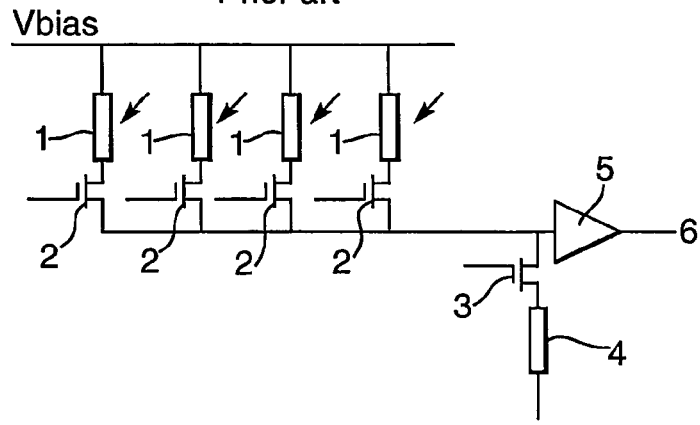
FIG. 1 is a schematic representation of a section of a conventional infrared focal plane detector common in the prior art.

Referring to FIG. 1, a conventional infrared focal plane detector array, such as a resistance bolometer array, comprises a two-dimensional array of sensitive detector elements (1). In the case of a resistance bolometer array each detector element (1) is biased with a voltage (Vbias) which causes a current to flow in the detector element (1). The magnitude of this current is sensed to detect the change of detector temperature due to the incident image. Conventionally, a dummy detector (4) is used to offset the bulk of this current at the end of each detector column. The use of a dummy detector channel enables the bias dynamic range to be reduced.

The output (6) from the focal plane detector may be subsequently processed external to the array to provide useful information, for example about objects within a scene. One particular processing application is to detect edges of objects within the scene.

Referring to FIG. 2, a focal plane detector according to the present invention incorporates an integral edge detection capability.

The focal plane detector according to the present invention is configured to detect edges of objects within a scene without recourse to external image processing means.

In the embodiment of the invention shown in FIG. 2, the focal plane detector incorporating integral edge detection comprises a plurality of detector elements (10) arranged in a reconfigurable array. Unlike a conventional focal plane detector, the output from the array corresponds to the gradient of the intensity of electromagnetic radiation incident on adjacent detector elements (10).

Figure 2A:
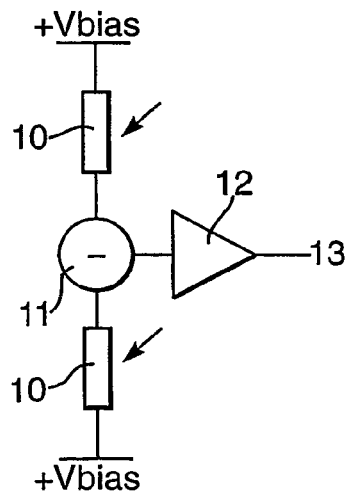
FIGS. 2a, 2b, 2c illustrate configurations capable of detecting horizontal edges, vertical edges, and diagonal edges respectively.

Referring specifically to FIG. 2a, FIG. 2a illustrates a section of the focal plane detector comprising two detector elements (10) disposed substantially vertically within the focal plane detector array. During the operation of the focal plane detector, the individual outputs from the two detector elements (10) are subtracted (11) to provide a focal plane output (13) which corresponds to the difference in the intensity of electromagnetic radiation incident on the two adjacent detector elements (10). An output buffer (12) provides the difference signal from the detectors (10) to the focal plane output (13).

When used in conjunction with focusing means, for example a lens, the configuration illustrated in FIG. 2a is capable of detecting substantially horizontal edges within a scene.

The configuration illustrated in FIG. 2a inherently exhibits an edge detection capability due to the differential arrangement of the detector elements (10). For example, assume that the two detector elements (10) are disposed within a common column of detector elements within the focal plane detector array, and that in use the column of detector elements is arranged in a substantially vertical orientation. When used in this arrangement to analyse an image of a scene incident on the focal plane detector, the detector elements (10) will exhibit maximum sensitivity to variations in image intensity which occur in a substantially vertical orientation in the image/scene. Accordingly, if the image of the scene is such that one of the detector elements is illuminated with a high intensity and the other detector element is illuminated with a low intensity then the output (13) from the focal plane detector will be large due to the large difference in the intensity of radiation incident on the respective detector elements.

Variations in image intensity which occur in a substantially vertical orientation typically arise from horizontal features in the image/scene, for example the edge of an object within the scene. Accordingly, the configuration illustrated in FIG. 2a will be particularly well adapted to detect horizontal features in the image corresponding to horizontal edges of objects within the scene.

Conversely, if the image of the scene is such that both detector elements (10) are illuminated with radiation of the roughly the same intensity then the output (13) from the focal plane detector will be small due to the negligible difference in the intensity of radiation incident on the respective detector elements. Hence, a small output from the focal plane detector will indicate an absence of horizontal features in that part of the image.

This configuration provides the advantage that any extraneous signal common to the detector elements (10) will be rejected. Hence common spurious noise and any effects which affect the whole array are rejected. This is particularly applicable to infrared focal plane detectors for reducing the effects of temperature changes within the array.

Figure 2B:
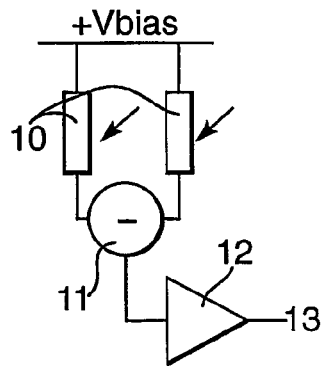

Referring specifically to FIG. 2b, FIG. 2b illustrates a section of the focal plane detector comprising two detector elements (10) disposed substantially horizontally within the focal plane detector array. During the operation of the focal plane detector, the individual outputs from the two detector elements (10) are subtracted (11) to provide a focal plane output (13) which corresponds to the difference in the intensity of electromagnetic radiation incident on the two adjacent detector elements (10). An output buffer (12) provides the difference signal from the detectors (10) to the focal plane output (13).

When used in conjunction with focusing means, for example a lens, the configuration illustrated in FIG. 2b is capable of detecting substantially vertical edges within a scene (see foregoing discussion regarding FIG. 2a). As before, any signal common to the detector elements (10) will be rejected.

Figure 2C:
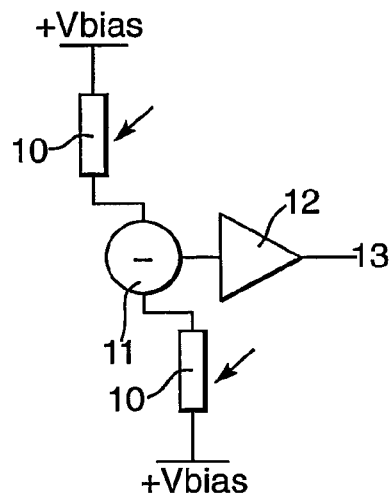

Referring specifically to FIG. 2c, FIG. 2c illustrates a section of the focal plane detector comprising two detector elements (10) disposed substantially diagonally within the focal plane detector array. During the operation of the focal plane detector, the individual outputs from the two detector elements (10) are subtracted (11) to provide a focal plane output (13) which corresponds to the difference in the intensity of electromagnetic radiation incident on the two adjacent detector elements (10). An output buffer (12) provides the difference signal from the detectors (10) to the focal plane output (13).

When used in conjunction with focusing means, for example a lens, the configuration illustrated in FIG. 2c is capable of detecting substantially diagonal edges within a scene (see foregoing discussion regarding FIG. 2a). As with FIGS. 2a and 2b, any signal common to the detector elements (10) will be rejected.

Referring to FIG. 3, the same effect may be achieved by using bipolar bias voltages (+Vbias and −Vbias respectively) applied to adjacent detector elements and summing (20) the individual outputs from adjacent detector elements (10).

Figure 3A:
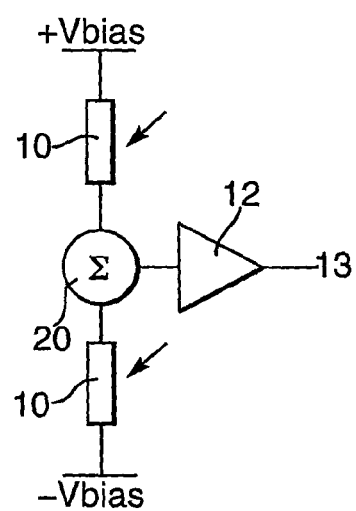
FIGS. 3a, 3b, 3c illustrate configurations capable of detecting horizontal edges, vertical edges, and diagonal edges respectively.

FIG. 3a illustrates a section of the focal plane detector comprising two detector elements (10) disposed substantially vertically within the focal plane detector array. During the operation of the focal plane detector, the individual outputs from the two detector elements (10) are summed (20) to provide a focal plane output (13) which corresponds to the difference in the intensity of electromagnetic radiation incident on the two adjacent detector elements (10). When used in conjunction with focusing means, for example a lens, the configuration illustrated in FIG. 3a is capable of detecting substantially horizontal edges within a scene.

Figure 3B:
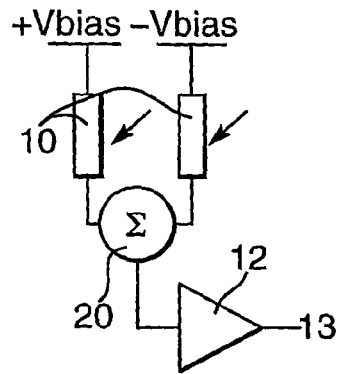

FIG. 3b illustrates a section of the focal plane detector comprising two detector elements (10) disposed substantially horizontally within the focal plane detector array. During the operation of the focal plane detector, the individual outputs from the two detector elements (10) are summed (20) to provide a focal plane output (13) which corresponds to the difference in the intensity of electromagnetic radiation incident on the two adjacent detector elements (10). When used in conjunction with focusing means, for example a lens, the configuration illustrated in FIG. 3b is capable of detecting substantially vertical edges within a scene.

Figure 3C:
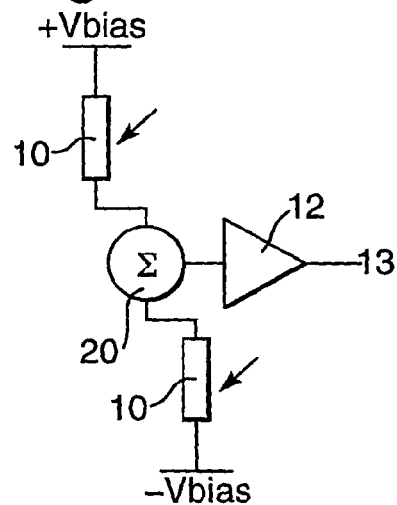

FIG. 3c illustrates a section of the focal plane detector comprising two detector elements (10) disposed substantially diagonally within the focal plane detector array. During the operation of the focal plane detector, the individual outputs from the two detector elements (10) are summed (20) to provide a focal plane output (13) which corresponds to the difference in the intensity of electromagnetic radiation incident on the two adjacent detector elements (10). When used in conjunction with focusing means, for example a lens, the configuration illustrated in FIG. 3c is capable of detecting substantially diagonal edges within a scene.

In common with the embodiment illustrated in with FIG. 2, any signal common to adjacent detector elements (10) will be rejected.

Figure 4:
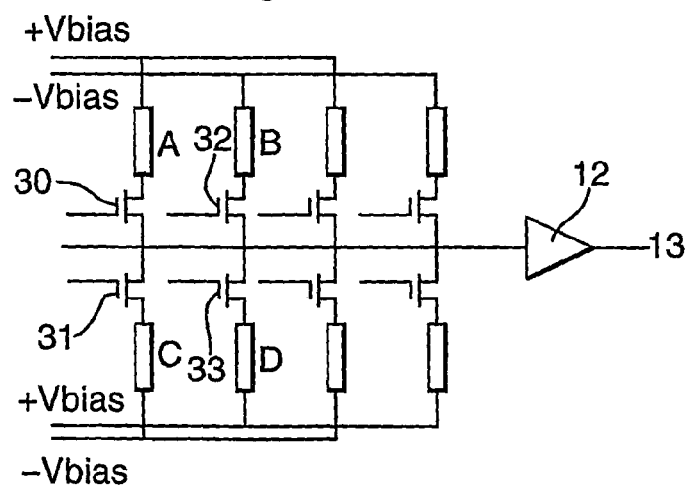
FIG. 4 is a schematic representation of an infrared focal plane detector according to the present invention.

Referring to FIG. 4, an infrared focal plane detector array according to the present invention comprises a two-dimensional array of infrared sensitive detector elements in which the outputs from adjacent detectors may be added or subtracted to detect edges of objects within a scene.

In the embodiment of the present invention illustrated in FIG. 4, adjacent detectors elements are operated with opposite polarity bias voltage (+Vbias and −Vbias respectively) and are connected together via switches (30,31,32,33) to a common read line.

During the operation of the infrared focal plane detector array, switches 30 and 32 will be activated to detect vertical edges. In this state any signal common to the detector elements (A and B) will be rejected. Similarly activating switches 30 and 31 will detect horizontal edges (using detector elements A and C). Diagonal edges can be detected by swapping the +Vbias and −Vbias connections on alternate rows of detector elements and using switches 30 and 33. (activating detector elements A and D) or switches 31 and 32 (activating detector elements B and C).

The output from the common read line is output to the focal plane output (13) via an output buffer (12).

Conventional intensity information can be made available by simply keeping the dummy channel so that when desired an intensity image can also be obtained.

The foregoing technique is applicable to bolometer infrared focal plane detectors and particularly to microbolometer focal plane detectors.

The use of a differential method according to the present invention in which the difference is taken across simultaneously operating active elements (which are nominally identical) provides excellent rejection of common spurious noise. Similarly, effects due to temperature changes which affect the whole array are reduced. No additional hardware/software is required external to the focal plane detector. Further, the readout speed of the focal plane detector may be preserved.

The invention claimed is:

1. A focal plane detector comprising
   a plurality of detector elements, each detector element adapted to receive electromagnetic radiation and configured to provide an output dependent on the intensity of the electromagnetic radiation incident thereon,
   selecting means for selecting first and second detector elements from any of said plurality of detector elements for combination; and
   means, integral to the focal plane detector, for combining the outputs from said first and second detector elements and for providing an output indicative of the difference in the intensity of the electromagnetic radiation incident on the first and second detector elements,
   wherein the output from the focal plane detector is comprised of the output from the combining means.

2. A focal plane detector according to claim 1 wherein the first and second detector elements are disposed adjacent each other within the focal plane detector.

3. A focal plane detector according to claim 1 wherein the detector elements are arranged in rows and columns therein.

4. A focal plane detector according to claim 3 wherein the first detector element and the second detector element are arranged in adjacent columns within the focal plane detector.

5. A focal plane detector according to claim 3 wherein the first detector element and the second detector element are arranged in adjacent rows within the focal plane detector.

6. A focal plane detector according to claim 3 wherein the first detector element is arranged in a first column and a first row within the focal plane detector and the second detector element is arranged in an adjacent column and an adjacent row to those of the first detector element.

7. A focal plane detector according to claim 1 wherein the detector elements are adapted to detect infrared radiation.

8. A focal plane detector according to claim 7 wherein the detector elements comprise bolometers.

9. A focal plane detector according to claim 8 wherein the first detector element is biased by a first bias voltage and the second detector element is biased by a second bias voltage, said bias voltages being of substantially equal magnitude.

10. A focal plane detector according to claim 9 wherein the first and second bias voltages have the same polarity and wherein the combining means comprises means for determining a difference in the outputs from the first and second detector elements.

11. A focal plane detector according to claim 9 wherein the first and second bias voltages have opposite polarity and wherein the combining means comprises means for summing the outputs from the first and second detector elements.

12. A focal plane detector according to claim 1 wherein the detector elements are adapted to detect radiation having a wavelength in the range 3 μm-14 μm.

13. A focal plane detector according to claim 1 wherein the selecting means are configured to select the detector elements so as to consecutively detect differences in the intensity of the electromagnetic radiation incident on the focal plane array in a first direction and a second direction, the first and second directions being different.

14. A focal plane detector according to claim 1 wherein the selecting means are capable of selecting, for any chosen first detector element within the focal plane array, a dummy detector element, and wherein the combining means are adapted to combine the output from the first detector element with that from the dummy detector element, so as to indicate the intensity of the electromagnetic radiation incident on the first detector element.

15. A camera having a focal plane detector according to claim 1.

16. A camera according to claim 15 and adapted to detect edges of the objects within a scene.

17. A camera according to claim 15 comprising a thermal imager.

18. A method of detecting an edge of an object within a scene incident on a focal plane detector having a plurality of detector elements, each detector element adapted to receive electromagnetic radiation incident thereon, comprising the steps of
selecting a first detector element within the focal plane detector and a second detector element from any of the plurality of remaining detector elements within the focal plane detector,
determining the intensity of the electromagnetic radiation incident on the first detector element within the focal plane detector,
determining the intensity of the electromagnetic radiation incident on the second detector element within the focal plane detector,
determining the difference in the intensity of the electromagnetic radiation incident on the first and second detector elements, and
communicating the difference in the intensity as an output from the focal plane detector.

19. A method according to claim 18 wherein the detector elements are arranged in an array having rows aligned in a first direction and columns aligned in a second direction.

20. A method according to claim 19 comprising the step of selecting a first detector element in a first column within the focal plane detector and selecting a second detector element in an adjacent column, and detecting edges of objects aligned substantially parallel with the second direction.

21. A method according to claim 19 comprising the step of selecting a first detector element in a first row within the focal plane detector and selecting a second detector element in an adjacent row, and detecting edges of objects aligned substantially parallel with the first direction.

22. A method according to claim 19 comprising the step of selecting a first detector element in a first column and a first row within the focal plane detector and selecting a second detector element in an adjacent column and an adjacent row to those of the first detector element, and detecting edges of objects aligned substantially parallel with a direction which bisects the angle between the first and second directions.

23. A method according to claim 19 wherein the first direction and the second direction are substantially perpendicular.

24. A method according to claim 19 wherein, in use, the first direction is arranged to be substantially vertical.

25. A method according to claim 19 wherein, in use, the first direction is arranged to be substantially horizontal.

* * * * *